(12) United States Patent
Nalven et al.

(10) Patent No.: US 7,261,057 B2
(45) Date of Patent: Aug. 28, 2007

(54) BIRD SHOWER

(75) Inventors: Kathy Nalven, 17773 Briar Patch Trail, Boca Raton, FL (US) 33487; Don Salerno, Hollywood, FL (US)

(73) Assignee: Kathy Nalven, Boca Raton, FL (US)

( * ) Notice: Subject to any disclaimer, the term of this patent is extended or adjusted under 35 U.S.C. 154(b) by 255 days.

(21) Appl. No.: 11/070,058

(22) Filed: Mar. 2, 2005

(65) Prior Publication Data
US 2006/0196437 A1 Sep. 7, 2006

(51) Int. Cl.
*A01K 45/00* (2006.01)
(52) U.S. Cl. .................. 119/69.5; 119/666
(58) Field of Classification Search .......... 119/69.5, 119/75, 666, 460; 4/615–617
See application file for complete search history.

(56) References Cited

U.S. PATENT DOCUMENTS

| 208,720 | A | | 10/1878 | Deshon | |
|---|---|---|---|---|---|
| 1,161,569 | A | * | 11/1915 | Winning | 119/345 |
| 1,303,851 | A | * | 5/1919 | Carlson | 119/666 |
| 1,372,533 | A | * | 3/1921 | Moore | 222/509 |
| 1,396,533 | A | | 11/1921 | Shaw | |
| 2,938,495 | A | | 5/1960 | Hinton | |
| 3,496,914 | A | * | 2/1970 | Cowan | 119/667 |
| 4,362,126 | A | | 12/1982 | Ellerstorfer et al. | |
| 5,553,568 | A | | 9/1996 | Verschuere et al. | |
| 6,520,118 | B2 | | 2/2003 | Swiegers et al. | |

\* cited by examiner

*Primary Examiner*—Kimberly S. Smith
(74) *Attorney, Agent, or Firm*—Laurence A. Greenberg; Werner H. Stemer; Alfred K. Dassler

(57) ABSTRACT

A showering device for a bird includes a perch and a movable actuator disposed adjacent the perch. The showering device has sealable liquid dispenser disposed above the perch and at least one linkage mechanism connects the perch and the moveable actuator to the sealable liquid dispenser. The showering device includes a device for unsealing the liquid dispenser via the linkage mechanism allowing water to flow from the liquid dispenser due to a movement of the actuator toward the perch.

20 Claims, 6 Drawing Sheets

BIRD SHOWER

BACKGROUND OF THE INVENTION

1. Field of the Invention

The invention relates to an apparatus for showering domesticated birds with fresh water, more specifically, to a shower which requires a bird to activate the showering mechanism by use of its talons.

2. Description of the Related Art

It is prior-art practice, for example, in the case of domesticated birds, which are kept as household pets, to use a bath for allowing the bird to cleanse itself in a pool of water. This practice has the disadvantage that the bird bathes itself in water that it has already soiled. It is also prior art practice to use a combination bird shower/bath. This practice has the disadvantage that an operator must manually pump the shower and the bird bathes and showers itself in water that it has already soiled.

In order to deal with this problem a solution has been proposed in the prior art. The solution is a bird shower that requires pumps and motion sensors for activation of the shower. This practice has the disadvantage of being relatively expensive, complex, and requires some form of external energy to function.

Accordingly, prior art ejector systems have the disadvantages that they do not provide a satisfactory solution for showering a bird in clean water without a complex construction and the need for external energy sources.

SUMMARY OF THE INVENTION

It is accordingly an object of the invention to provide a bird shower which overcomes the above-mentioned disadvantages of the heretofore-known devices of this general type and which provides a bird shower that is activated by a bird, easily manufactured, easy to maintain, is durable, and reliable.

With the foregoing and other objects in view there is provided, a showering device for a bird, which includes a perch and a movable actuator disposed adjacent the perch. A sealable liquid dispenser is disposed above the perch. At least one linkage mechanism connects the moveable actuator to the sealable liquid dispenser. A device for unsealing the liquid dispenser via the linkage mechanism allows water to flow from the liquid dispenser due to a movement of the actuator toward the perch.

In accordance with another feature of the invention, the sealable liquid dispenser includes a tank with an opening formed therein and the opening has a seal. The sealable liquid dispenser includes a dispensing chamber disposed below the tank and the chamber has a plurality of orifices formed therein.

In accordance with a further feature of the invention, a stopper is disposed and securely seated in the opening of the tank. The device for unsealing the dispensing unit is a lifting arm connected to the linkage mechanism to unseat the stopper for allowing liquid to flow into and out of the dispensing chamber.

In accordance with an added feature of the invention, the stopper has a density, which makes the stopper buoyant.

In accordance with an additional feature of the invention a guide-tube is disposed in the tank for guiding movement of the stopper.

In accordance with yet another feature of the invention, the linkage mechanism has a first rotatable shaft, at least one first lever arm to attach the actuator to the first rotatable shaft, a second rotatable shaft to mount the lifting arm, and at least one linkage bar. The linkage mechanism has at least one second lever arm to attach the first rotatable shaft to the at least one linkage bar, at least one third lever arm to attach the at least one linkage bar to the second rotatable shaft, and at least one spring attached to the linkage mechanism to bias the actuator away from the perch.

In accordance with yet a further feature of the invention, two uprights are disposed at a distance from one another on a base. The perch, the actuator, and the sealable liquid dispenser are disposed between the uprights and the linkage mechanism is disposed on one of the uprights.

In accordance with yet an added feature of the invention, the at least one first lever arm is two first lever arms each disposed at a respective one of the uprights. The at least one linkage bar is two linkage bars each disposed at a respective one of the uprights. The at least one second lever arm is two second lever arms each disposed at a respective one of the uprights. The at least one third lever arm is two third lever arms each disposed at a respective one of the uprights. The at least one spring is a plurality of springs.

In accordance with yet an additional feature of the invention, claddings are disposed on the uprights for covering the linkage mechanism.

In accordance with still another feature of the invention, a catch basin is disposed under the base for collecting the liquid.

With the objects of the invention in view, there is also provided a showering device including a base and vertical uprights disposed on the base. A perch is disposed between the vertical uprights. A movable actuating bar is disposed between the uprights and adjacent the perch. A liquid storage tank is disposed above the perch, the tank having a hole formed therein. A dispensing chamber is disposed below the tank and a stopper is disposed in the hole for sealing the tank. At least one linkage mechanism is disposed at a respective one of the vertical uprights. A lifting arm is disposed between the vertical uprights, the lifting arm unseats the stopper via the linkage mechanism for allowing water to flow into and out of the dispensing chamber, due to a movement of the actuating bar toward the perch.

In accordance with still a further feature of the invention, a spring is attached to the linkage mechanism for biasing the actuating bar away from the perch.

In accordance with yet still a further feature of the invention, the linkage mechanism is one of two linkage mechanisms each disposed at a respective one of the uprights.

Other features which are considered as characteristic for the invention are set forth in the appended claims.

Although the invention is illustrated and described herein as embodied in a bird shower, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
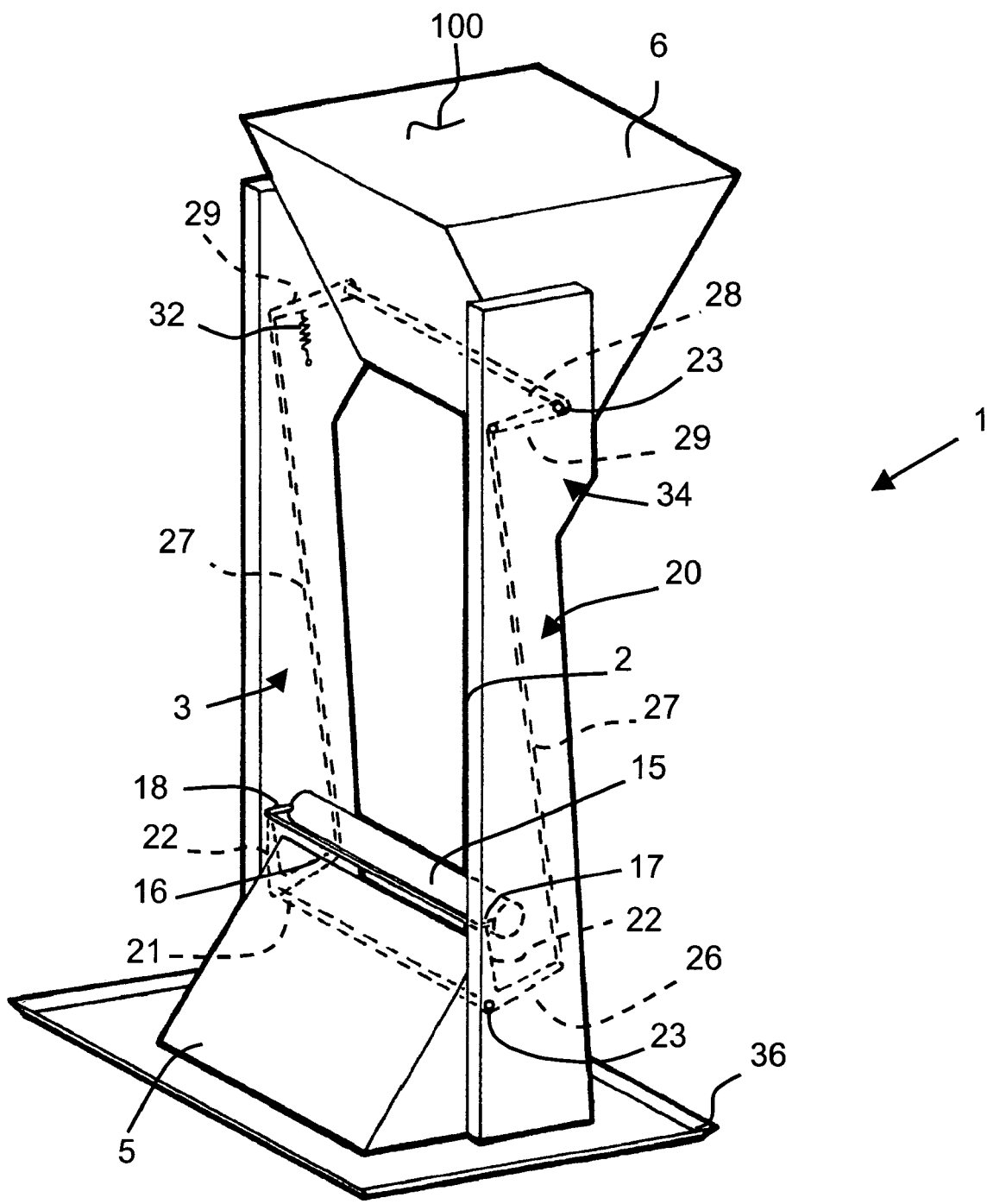
FIG. 1 is a perspective view of the bird shower according to the invention.
Figure 2:
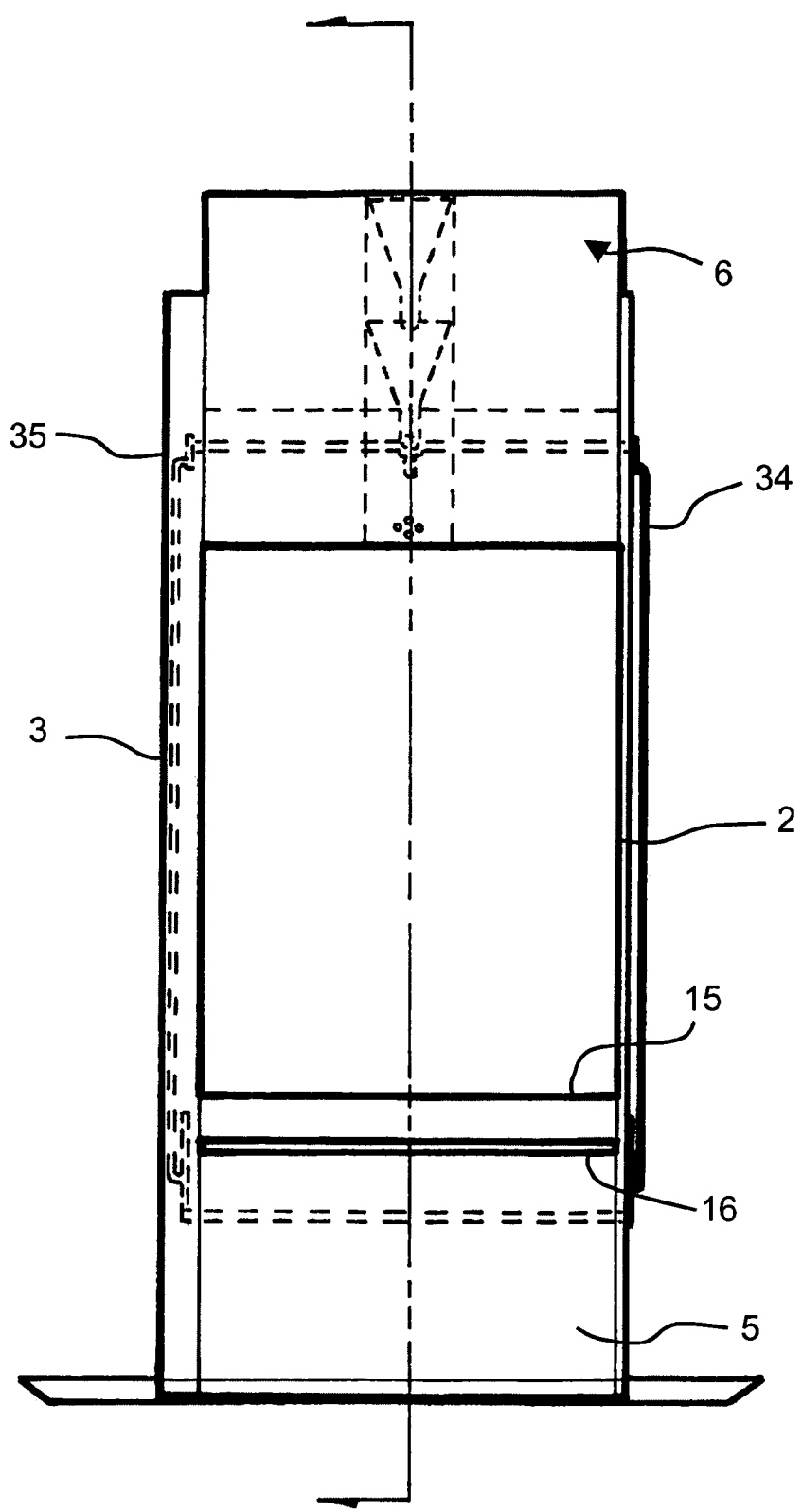
FIG. 2 is a front-elevational view of the bird shower of the according to FIG. 1.

Referring now to the figures of the drawing in detail and first, particularly, to FIG. 1 thereof, there is seen a bird shower 1 according to the invention. The bird shower 1 can be made in different sizes for accommodating different sized birds.

The shower includes two separate uprights 2 and 3 that are mounted to a base 5. On the upper end of the uprights a water reservoir/tank 6 is disposed between the uprights 2 and 3. The water tank 6 is filled with liquid/water 100 for showering a bird. The tank 6 includes a cover 7 shown in FIG. 6 for closing the tank after it has been filled with liquid 100.

Figure 5:
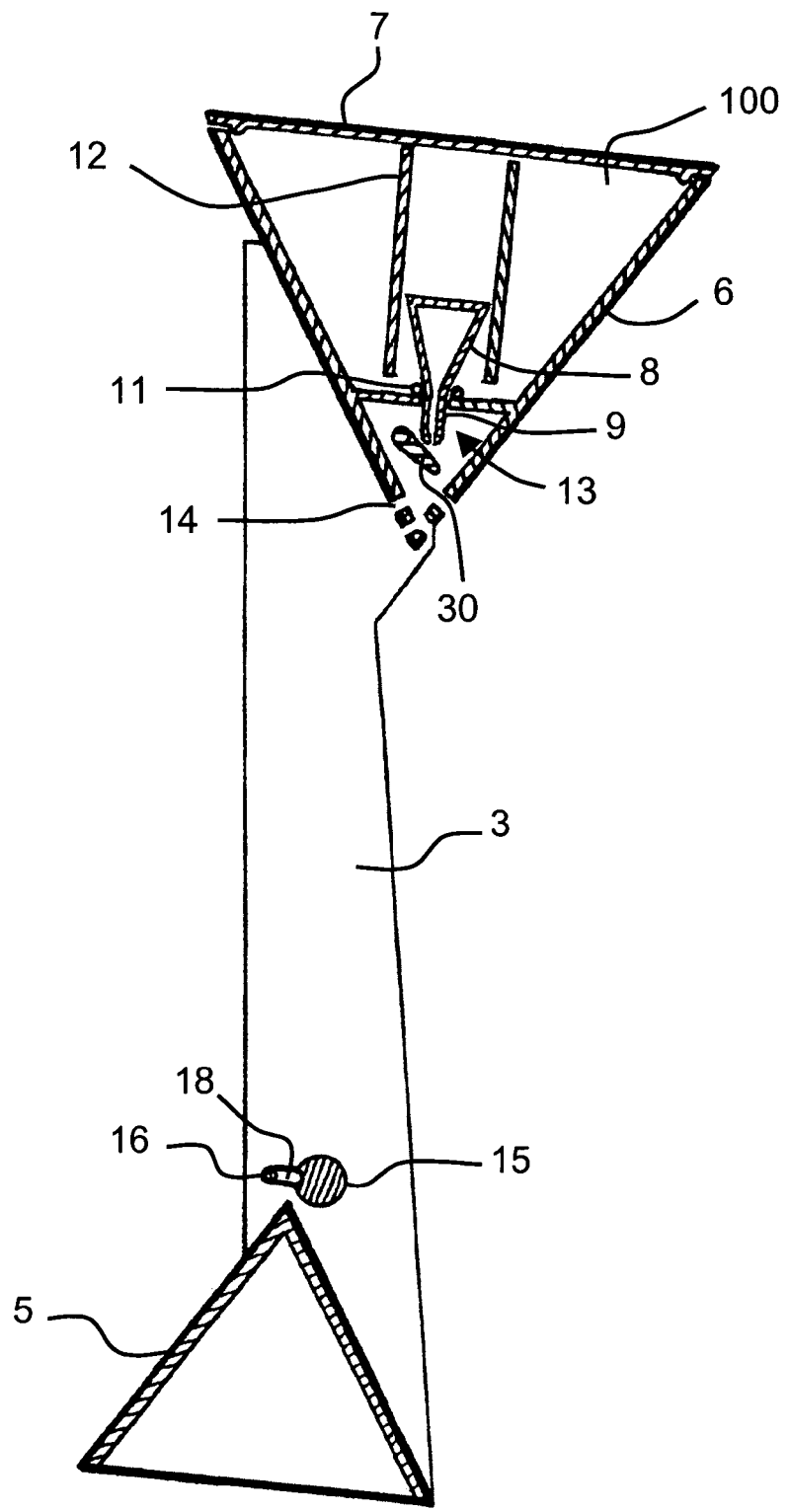
FIG. 5 is a sectional view of the bird shower according to FIG. 1 with the shower in an off position as shown by the section line II-II in FIG. 3.
Figure 6:
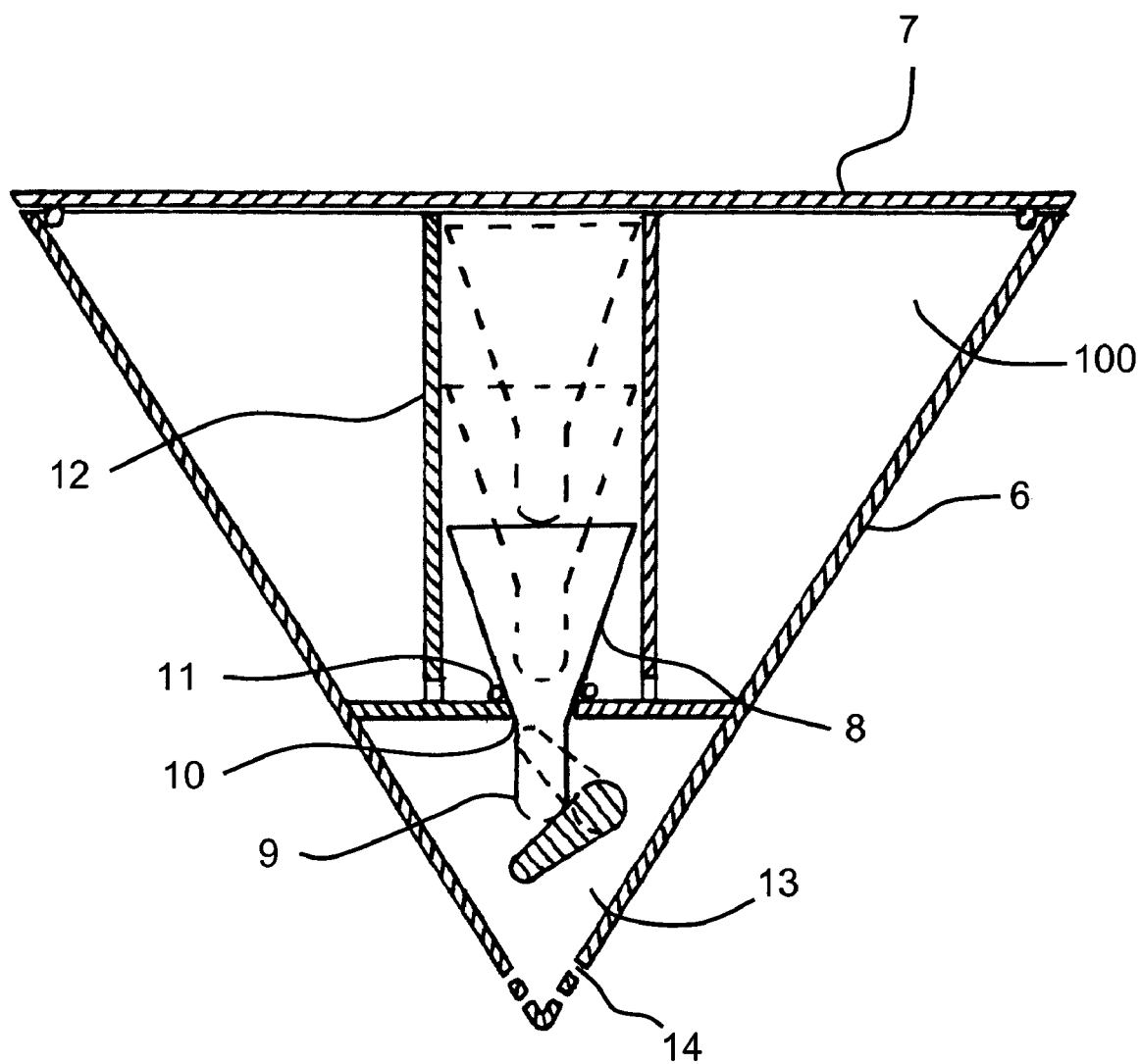
FIG. 6 is a partial sectional view of the bird shower according to FIG. 5 with the shower in an on position.

As can be seen in FIGS. 5 and 6 a stopper 8 having a conical tip 9 is provided inside the tank 6 so that the conical tip 9 projects through a hole 10 that is formed in the tank 6. The hole 10 includes a seal 11, which seals against and seats the stopper 8 so that the tank 6 can hold water. The tank also includes a vertically disposed guide-tube 12, which serves to guide the stopper 8 at its periphery. The guide-tube 12 includes has holes 40 formed therein for allowing an exchange of liquid between the guide-tube 12 and the tank 6. The stopper 8 has a density, which allows it to float to the surface of the tank 6 when it is unseated from the hole 10.

Disposed below the tank 6 is a dispensing chamber 13 having orifices 14 formed therein. The dispensing chamber 13 is smaller in volume than the tank 6 and is funnel-shaped or has opposing sides that are angle toward each other. The dispensing chamber 13 receives water from the tank 6 and dispenses the water in a shower spray onto the bird through the orifices 14. A bird's talons activate a linkage mechanism 20 shown in FIG. 1, which allows the unseating of the stopper 8 from the seal 11, which in turn allows the stopper 8 to float to the surface of the water in the tank 6, thereby allowing water to flow from the tank 6 into the dispensing chamber 13. From the dispensing chamber 13 water is dispensed through the orifices 14 onto the bird. The linkage mechanism 20 for activating the shower will be discussed below.

A fixed perch 15 is disposed between the two uprights 2 and 3. An actuator or actuating bar 16 which is adjacent the perch 15 projects through slots 17 and 18 formed in the uprights 2 and 3, which allow the actuating bar to pivot. The actuator 16 is disposed so as to be graspable by the talons of a bird using the bird shower. The bar is disposed so that a bird can grip the actuator 16 with either their rear or front talons. When the bird is placed on the perch 15 it will instinctively grab onto the actuating bar 16 and pull it towards the perch 15. Although not shown, it is possible for the perch 15 to include a groove for receiving the actuating bar 16 so that the actuating bar 16 is flush with the perch 15. The actuating bar 16 is connected to the linkage mechanism 20 for activating the water flow. Although not shown, the base 5 can have stairs or a ladder, which will allow the bird to reach the perch 15.

The linkage mechanism 20 includes a rotatable shaft 21 that is disposed below the actuator 16 and between the uprights 2 and 3. The rotatable shaft 21 is mounted by bearings 23 and may be enclosed in a sleeve (not shown). The rotatable shaft 21 serves as the axis of rotation for the actuator 16 and is attached to the actuator 16 by first lever arms 22, which are disposed on the ends of the rotatable shaft 21. The rotatable shaft 21 also has second lever arms 26 disposed on opposite ends of the shaft. The second lever arms 26 are attached to linkage bars 27, which extend up along the uprights 2 and 3 towards the tank 6. The linkage mechanism includes a second rotatable shaft 28 disposed between the uprights 2 and 3 and which runs through the dispensing chamber 13. The second rotatable shaft 28 is mounted by bearings 23. Third lever arms 29 connect the linkage bars 27 to the second rotatable shaft 28. The second rotatable shaft 28 of the linkage mechanism displaces a lifting arm 30, which is disposed on the second rotatable shaft 28 inside the dispensing chamber 13 for unseating the stopper 8 up out of the hole 10 when a bird activates the actuator 16. Springs 32 are part of the linkage mechanism and serve for biasing the actuator 16 away from the perch 15 and provide the resistance, which allows the stopper 8 to close the tank 6 when the tank is emptied.

It is noted that the number, location, and/or type of springs (i.e. torsion springs, tension springs, compression springs, etc. can be used) is not critical, as long as it biases the actuator 16 away from the perch and does not require excessive force to overcome. Furthermore, while the linkage mechanism 20 as described above includes two first lever arms 22, second lever arms 26, third lever arms 29, linkage bars 27 etc. it is possible for the linkage mechanism to include only one set of these items employed on one of the two uprights 2, 3.

Also provided are claddings 34 and 35, which are disposed on the uprights for covering those parts of the linkage mechanism 20 that are disposed on the uprights 2, 3. A catch basin 36 may be disposed under the bird shower 1 for collecting the water 100 that showers the bird.

The operation of the device during use by a bird will be described with respect to the drawings and the above-provided description.

Figure 3:
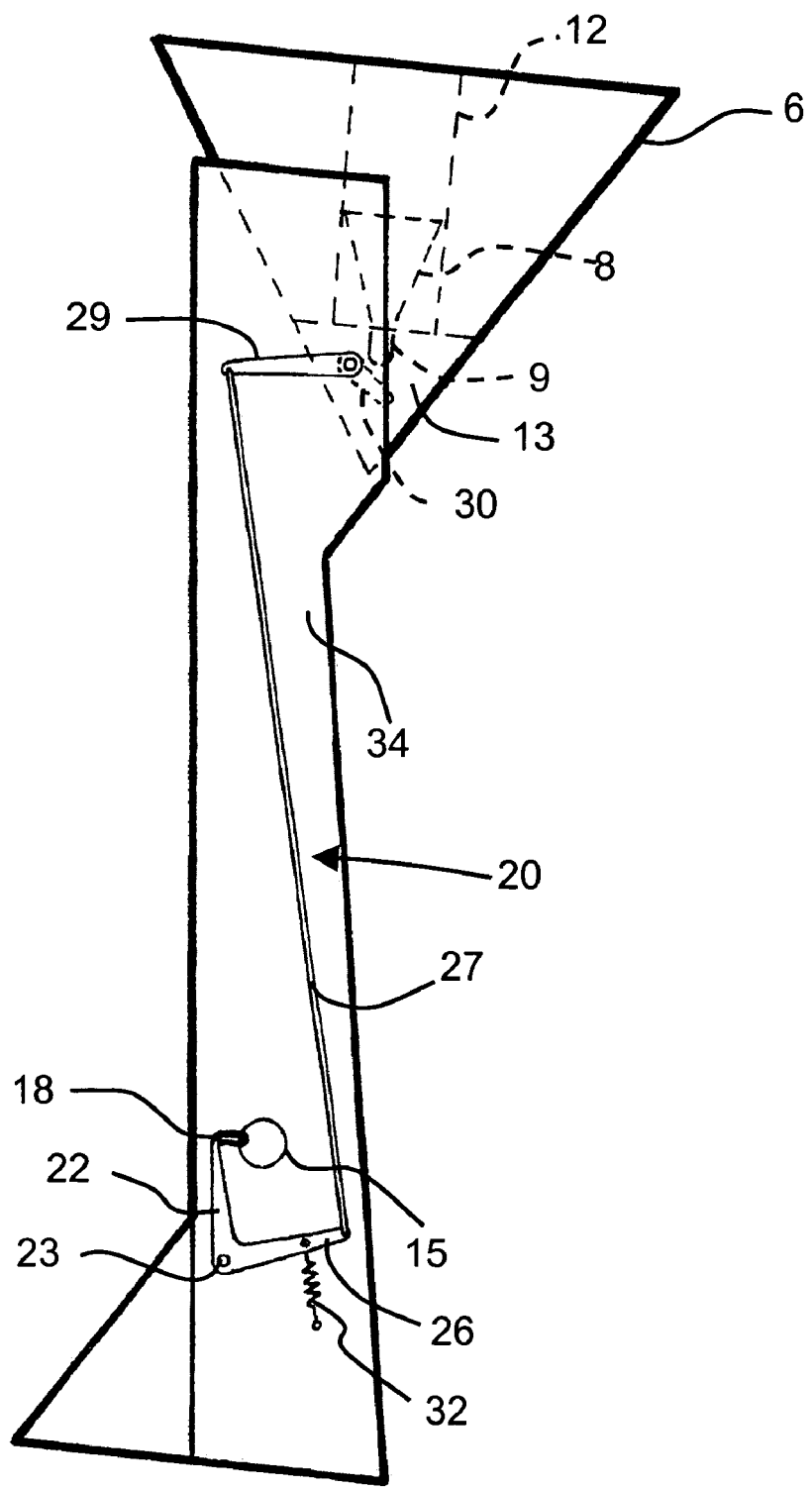
FIG. 3 is a side-elevational view of the bird shower according to FIG. 1.
Figure 4:
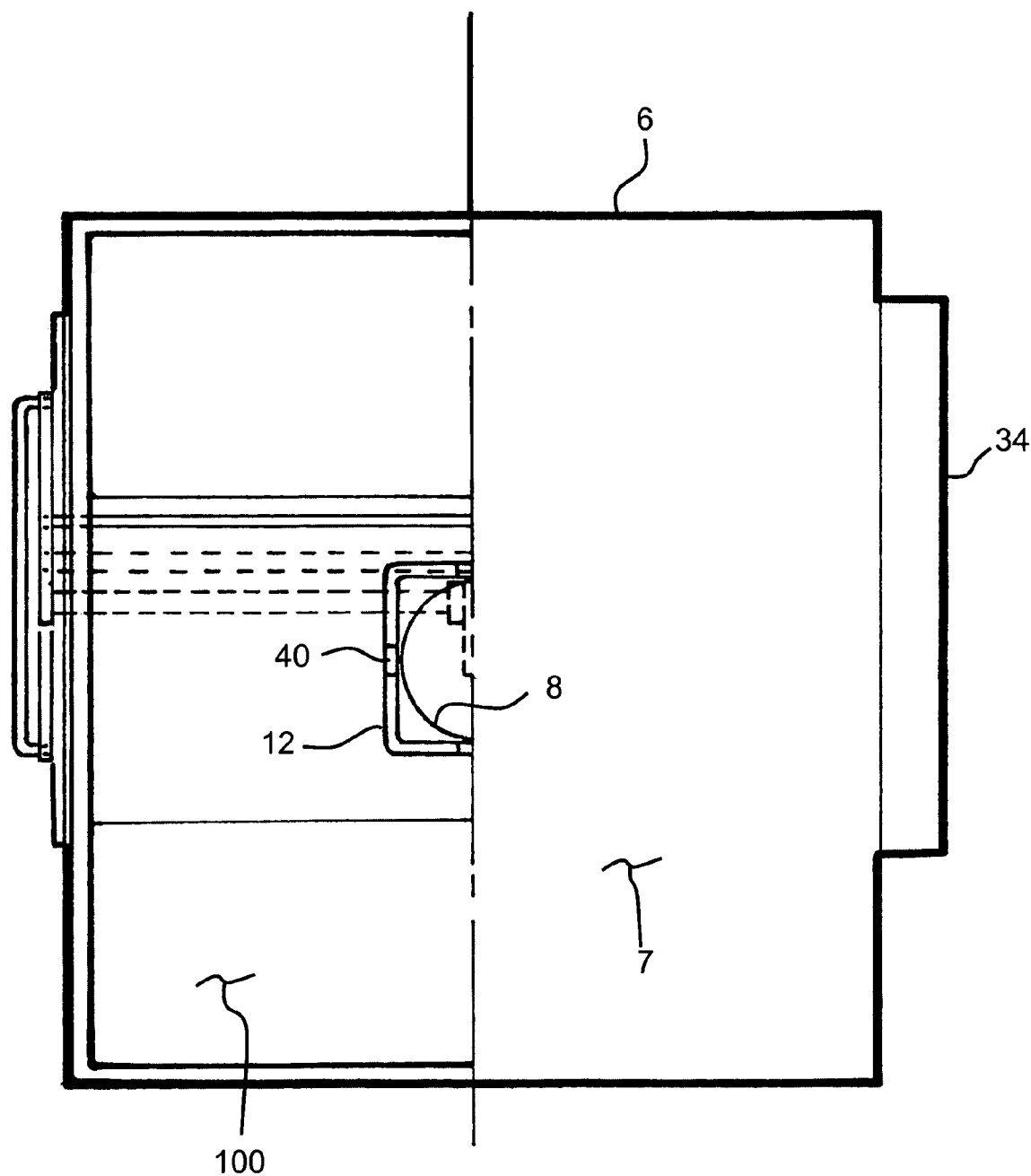
FIG. 4 is a top plan view of the bird shower according to FIG. 1.

The stopper 8 is placed in the hole 10 so that it seats against the seal 11. The desired amount of water 100 is added into the tank 8. A bird moves to or is placed on the perch 15, the bird's talons grip the perch 15 and the actuating bar 16 pulling the actuating bar 16 towards the perch against the bias of the springs 32. The first lever arm 22 in turn rotates the first rotatable shaft 21, which in turn causes the second lever arm 26 to rotate (see FIGS. 1 and 3). The second lever 26 moves the linkage bar 27 causing the third lever arm 29 to rotate the second rotatable shaft 28. The rotation of the second rotatable shaft 28 moves the lifting arm 30, thereby unseating the stopper 8 from the hole 10 formed in the tank 6. This releases the stopper 8 from the seal 11 so that the stopper 8 floats up to the surface of the water 100 in the tank 6, thereby allowing the water 100 to flow from the tank 6 into the dispensing chamber 13 and out of the orifices 14 onto the bird. Once the bird releases the actuating bar 16 the biasing springs 32 return the linkage mechanism 20 to its original position. However, this does not have an effect on the flow of the water 100 as the stopper 8 has been unseated and floats at the surface of the water 100 in the tank 6. Once the water 100 has emptied from the tank 6, the stopper 8 finds its way back into the hole 10 with the aid of the guide-tube 12. It is also possible for the stopper 8 to have a density that does not allow it to float. In such a scenario, the only time that the water would flow is when the bird's talons grip the actuating bar 16.

We claim:
1. A showering device for a bird, comprising:
a fixed perch;
a movable actuator disposed adjacent said perch;
a sealable liquid dispenser disposed above said perch;
at least one linkage mechanism connecting said moveable actuator to said sealable liquid dispenser;
a device for unsealing said liquid dispenser via said linkage mechanism allowing water to flow from said liquid dispenser due to a movement of said actuator toward said perch.

2. The showering device according to claim 1, wherein:
said sealable liquid dispenser includes:
a tank with an opening formed therein, said opening having a seal; and
a dispensing chamber disposed below said tank, said chamber having a plurality orifices formed therein.

3. The showering device according to claim 2, wherein:
a stopper is disposed and securely seated in said opening of said tank;
said device for unsealing said liquid dispenser is a lifting arm connected to said linkage mechanism to unseat said stopper for allowing liquid to flow into and out of said dispensing chamber.

4. The showering device according to claim 3, wherein said stopper is constructed to be buoyant.

5. The showering device according to claim 4, further comprising:
a guide-tube disposed in said tank for guiding movement of said stopper.

6. The showering device according to claim 3, wherein:
said linkage mechanism has;
a first rotatable shaft;
at least one first lever arm to attach said actuator to said first rotatable shaft;
a second rotatable shaft to mount said lifting arm;
at least one linkage bar;
at least one second lever arm to attach said first rotatable shaft to said at least one linkage bar;
at least one third lever arm to attach said at least one linkage bar to said second rotatable shaft; and
at least one spring attached to said linkage mechanism to bias, said actuator away from said perch.

7. The showering device according to claim 6, further comprising:
two uprights disposed at a distance from one another on a base, said perch, said actuator, and said sealable liquid dispenser being disposed between said uprights and said linkage mechanism being disposed on one of said uprights.

8. The showering device according to claim 7, wherein:
said at least one first lever arm is two first lever arms each disposed at a respective one of said uprights;
said at least one linkage bar is two linkage bars each disposed at a respective one of said uprights;
said at least one second lever arm is two second lever arms each disposed at a respective one of said uprights;
said at least one third lever arm is two third lever arms each disposed at a respective one of said uprights; and
said at least one spring is a plurality of springs.

9. The showering device according to claim 7, further comprising:
claddings disposed on said uprights for covering said linkage mechanism.

10. The showering device according to claim 7, further comprising:
a catch basin disposed under said base for collecting the liquid.

11. The showering device according to claim 1, wherein said actuator is provided as a rod disposed substantially parallel to said perch.

12. The showering device according to claim 1, wherein said actuator is disposed to be graspable by talons of the bird standing on said perch.

13. A showering device comprising:
a base;
vertical uprights disposed on said base;
a perch disposed between said vertical uprights;
a movable actuating bar disposed between said uprights and adjacent said perch;
a liquid storage tank disposed above said perch, said tank having a hole formed therein;
a dispensing chamber disposed below said tank;
a stopper disposed in said hole for sealing said tank;
at least one linkage mechanism disposed at a respective one of said vertical uprights;
a lifting arm disposed between said vertical uprights, said lifting arm unseating said stopper via said linkage mechanism for allowing water to flow into and out of said dispensing chamber, due to a movement of said actuating bar toward said perch.

14. The showering device according to claim 13, further comprising:
a spring attached to said linkage mechanism for biasing the actuating bar away from said perch.

15. The showering device according to claim 13, wherein said linkage mechanism is one of two linkage mechanisms each disposed at a respective one of said uprights.

16. The showering device according to claim 13, wherein said stopper is constructed to be buoyant.

17. The showering device according to claim 16, further comprising:
a guide-tube disposed in said tank for guiding movement of said stopper.

18. The showering device according to claim 13, wherein:
said linkage mechanism has:
a first rotatable shaft;
at least one first lever arm to attach said actuator (16) to said first rotatable shaft;
a second rotatable shaft to mount said lifting arm;
at least one linkage bar;
at least one second lever arm to attach said first rotatable shaft to said at least one linkage bar;
at least one third lever arm to attach said at least one linkage bar to said second rotatable shaft; and
at least one spring attached to said linkage mechanism to bias said actuator away from said perch.

19. A showering device for a bird, comprising:
a perch;
a movable actuator disposed adjacent said perch for being graspable by talons of the bird standing on said perch;
a sealable liquid dispenser disposed above said perch;
at least one linkage mechanism connecting said moveable actuator to said sealable liquid dispenser;

a device for unsealing said liquid dispenser via said linkage mechanism allowing water to flow from said liquid dispenser due to a movement of said actuator toward said perch.

20. A showering device for a bird, comprising:
a perch configured as a rod;
a movable actuator disposed adjacent said perch;
a sealable liquid dispenser disposed above said perch;
at least one linkage mechanism connecting said moveable actuator to said sealable liquid dispenser;
a device for unsealing said liquid dispenser via said linkage mechanism allowing water to flow from said liquid dispenser due to a movement of said actuator toward said perch.

* * * * *